United States Patent
Lin et al.

(10) Patent No.: US 9,249,629 B2
(45) Date of Patent: Feb. 2, 2016

(54) ENHANCED BACKUP RING EDGE FEATURES FOR METAL FACE SEAL IN ROLLER CONE DRILL BITS

(71) Applicant: Baker Hughes Incorporated, Houston, TX (US)

(72) Inventors: Chih Lin, Huntsville, TX (US); Terry J. Koltermann, Corpus Christi, TX (US); Anton F. Zahradnik, Sugar Land, TX (US); Gregory L. Ricks, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/808,817

(22) Filed: Jul. 24, 2015

(65) Prior Publication Data

US 2015/0330152 A1    Nov. 19, 2015

Related U.S. Application Data

(63) Continuation of application No. 13/763,405, filed on Feb. 8, 2013.

(51) Int. Cl.
*E21B 10/25* (2006.01)
*E21B 10/22* (2006.01)

(52) U.S. Cl.
CPC .......... *E21B 10/25* (2013.01); *E21B 2010/225* (2013.01)

(58) Field of Classification Search
CPC ......... E21B 10/08; E21B 10/22; E21B 10/25; E21B 2010/225
See application file for complete search history.

(56) References Cited

U.S. PATENT DOCUMENTS

| | | | |
|---|---|---|---|
| 4,824,123 | A | 4/1989 | Chia et al. |
| 6,123,337 | A | 9/2000 | Fang et al. |
| 6,536,542 | B1 | 3/2003 | Fang et al. |
| 7,347,290 | B2 | 3/2008 | Yu et al. |
| 7,413,037 | B2 | 8/2008 | Lin et al. |
| 2004/0040747 | A1 | 3/2004 | Neville et al. |
| 2006/0032673 | A1 | 2/2006 | Yong et al. |
| 2008/0099244 | A1 | 5/2008 | Chellappa et al. |

*Primary Examiner* — Gilbert Lee
(74) *Attorney, Agent, or Firm* — Steve Rosenblatt

(57) ABSTRACT

A backup ring for a face seal in a roller cone bit is configured to resist wear from drilling fluids present adjacent exposed faces of the backup ring. Portions are removed from an exposed end face in a variety of shapes while the hardness of the material is increased. The removal of material offsets an increase in force that would be transmitted through the backup ring on face seal assembly due to flexing. A spring can optionally be included in the removed material location. Another way is to increase the edge density of all or part of the exposed edges while leaving the interior portions unaffected by using electron beam radiation to increase the crosslink density or by other techniques that allow a unitary structure with a more durable edge region.

10 Claims, 5 Drawing Sheets

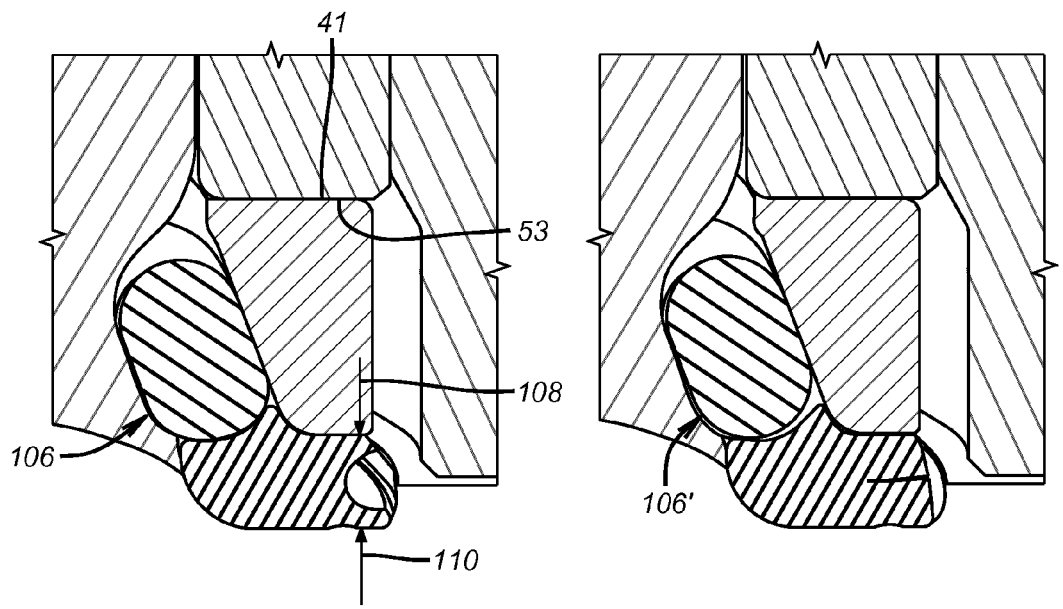
FIG. 6  FIG. 8
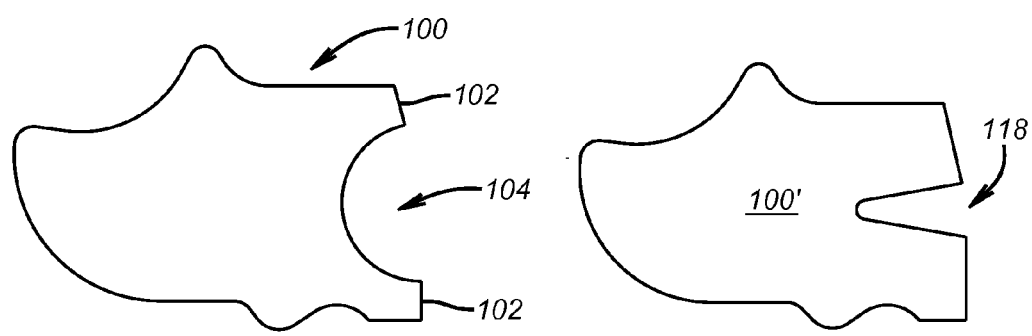
FIG. 5  FIG. 7

ENHANCED BACKUP RING EDGE FEATURES FOR METAL FACE SEAL IN ROLLER CONE DRILL BITS

CROSS REFERENCE TO RELATED APPLICATION

This application is a continuation of U.S. patent application Ser. No. 13/763,405 filed on Feb. 8, 2013.

FIELD OF THE INVENTION

The field of the invention is roller cone drill bits and more particularly backup seal designs for face seals that increase durability while giving the desired contact pressure on the relatively moving components.

BACKGROUND OF THE INVENTION

Components of a rolling cone bit mechanical face seal system utilized to seal the bearing typically include (A) two hard material components typically metal having surfaces engaged and sliding with relation to each other, (B) an elastomeric static seal ring with the primary function of providing an energizing force to one of the hard material components such that the surfaces of the hard material components are engaged at some designed contact pressure, (C) a second static sealing elastomer component sometimes referred to as a backup ring residing outside of a first elastomer component and engaged with one of the hard material components. This second elastomer component having the primary function of stopping ingress of the drilling environment into the annular space between one of the hard material seal components and the base area of the bearing pin which forms a gland for the elastomer energizer. This second static sealing elastomer component sometimes referred to as a backup ring often is the first component in the mechanical face sealing system to fail. Failure is typically in the form of tearing and wear generally initiating in the area of the outside diameter of the backup ring and on the surface engaged with one of the hard material seal components.

A backup ring (BUR) in a mechanical face seal assembly serves one or more of the following purposes: contribute to the face load; protect the energizer or energizing mechanism; provide resisting torque to prevent stationary seal from rotating; and fill the gland area to reduce the effect of mud packing. In the prior art, a low Shore A hardness elastomeric compound was used to meet the design requirements. Field experience shows that this material can degrade and often suffers tear and loses its function.

The basic assembly of a roller cone bearing seal assembly using a backup ring 55 is described in U.S. Pat. Nos. 6,142,249 and 7,168,147 which is presented below for context for the improvements to the backup ring contemplated by the present invention.

The numeral 11 in FIG. 1 of the drawing designates an earth-boring bit having a threaded upper portion 13 for connection to a drill string member (not shown). A fluid passage 15 directs drilling fluid to a nozzle (not shown) that impinges drilling fluid or mud against the borehole bottom to flush cuttings to the surface of the earth.

A pressure-compensating lubrication system 17 is contained within each section of the body, there usually being three, which are welded together to form the composite body. The lubrication system is preferably similar to that shown in U.S. Pat. No. 4,727,942, to Galle.

In each section of the body, a lubricant passage 19 extends from each compensator 17 downwardly into intersection with another lubricant passage 21 in which a ball plug 23 is secured to the body by a plug weld 25. Lubricant passages 27 carry lubricant to a cylindrical journal bearing surface defined between a cylindrical insert 29 (interference fit in cutter 33) and a corresponding cylindrical surface on bearing shaft 30, which is cantilevered downwardly and inwardly from an outer and lower region of the body of the bit, commonly known as the shirttail. Ball plug 23 retains a series of ball bearings 31 that rotatably secure cutter 33 to bearing shaft 30. Dispersed in the cutter are a plurality of rows of earth-disintegrating cutting elements or teeth 35 that may be constructed of a sintered tungsten carbide secured by interference fit into mating holes in cutter 33. A seal assembly 37, including a secondary seal is disposed adjacent the base of bearing shaft 30 and seals lubricant within the bearing and debris out of the bearing.

FIGS. 2 and 3 are enlarged section views of the bearing and seal assembly of the earth-boring bit. A pair of axial surfaces 39, 41 formed in cutter 33 and last-machined surface 43 of the shirttail portion of the bit body cooperate with a pair of radial surfaces 45, 47 to define a bearing seal gland generally at the base of bearing shaft 30. A seal assembly 37 is disposed in the seal gland and includes a rigid seal ring 49 and an o-ring energizer 51, which urges a seal face 53 on ring 49 into sealing engagement with a corresponding seal face 41 on an insert 29 in cutter 33. This rigid face seal is formed in accordance with U.S. Pat. No. 4,753,304, to Kelly.

Seal assembly 37 may be regarded as a primary seal because it is designed to seal the journal bearing against entry of foreign material or debris and to accommodate pressure fluctuations in the lubricant. Seal 37 is also a dynamic seal because it seals the moving or dynamic interface between each cutter and its bearing shaft and the relative rotational movement between them.

In addition to dynamic seal 37, a secondary or backup seal ring 55 is disposed in the seal gland opposite between seal assembly 37 and last-machined surface 43 to seal the seal gland and seal assembly 37 against entry of debris, particularly drilling mud particles, from the exterior of bit 11. To accommodate seal ring 55 and seal 37, axial surface 39 is in a groove machined into last-machined surface 43 to a depth approximately one-third to one-half the nominal axial thickness of ring 55. Axial surface 39 may be flush with last-machined surface 47.

FIG. 4 is an enlarged cross-section view of ring 55. Preferably, secondary seal ring 55 is a continuous ring formed of nitrile elastomer material of about 40-45 durometer (Shore A) and a modulus of about 200-400 psi/in/in. Preferably, no adhesive is used to secure ring 55 in the seal gland. Alternatively, secondary seal ring 55 may be attached or secured by adhesive to axial seal gland surface 39 (or last-machined surface 43) and to rigid seal ring 49 to enhance its sealing ability. Because secondary seal ring 55 remains stationary with last-machined surface 47 and does not seal relative rotary motion, it is a static seal, as opposed to seal 37, which is a dynamic seal.

For an 8½ inch bit, secondary seal ring 55 has an outer diameter D of approximately 2.480 inch and a radial width W is of about 0.211 inch. Outer diameter D is selected to be about 0.040 to 0.060 inch larger than the outer diameter of rigid ring 49. The inner surface or diameter and end 57 of secondary seal ring 55 are configured to be similar to and respectively conform to radial surface 45 and axial surface 39 of the seal gland. A radius $R_1$ of about 0.085 inch and a tip radius $R_2$ of about 0.015 inch are provided at the inner end of secondary seal ring 55.

Ring 55 also includes two raised ribs 57 which are approximately 0.025 inch to 0.030 inch wide and 0.010 inch to 0.014 inch high. The purpose of the ribs is to form high-stress areas to deter the entry of fluid and/or debris into the seal gland when secondary seal ring 55 is forced into contact with surface 39.

Ring 55 has an axial thickness t of about 0.095 inch (in the uncompressed or relaxed state), which is greater than the gap formed between axial surface 39 and the end of seal ring 49. The intent is to provide sufficient "squeeze" on secondary seal ring 55 between axial surface 39 and seal ring 49. In the preferred embodiment, this squeeze is approximately 20% to 25% of the uncompressed or relaxed radial thickness t of ring 55 using nominal values and with the cutter forced outward on the bearing shaft. A radius $R_3$ of about 0.125 inch is provided to permit deformation of energizer ring 51 and to closely conform to it. The remaining width w of ring 55 is about 0.104 inch.

In the assembled configuration, the area in the seal gland bounded by surfaces 39 and 45, including rings 49, 51, and 55, is intended to be assembled so as to minimize or exclude air. Upon assembly, a continuous ring of heavy mineral oil is applied to at least axial surface 39, then secondary seal ring 55 is placed in the seal gland and energizer 51 and seal ring 49 are installed. This assembly process helps to insure that void areas are minimized and/or eliminated in the aforementioned area of the seal gland. In a later improvement shown in U.S. Pat. No. 7,413,037 the mineral oil was not needed as the shape of the backup ring was changed to have protrusions to fill the gaps that formerly were filled with the heavy mineral oil.

The problem with this design in the past is the tearing or breaking off of segments from the outer end of the backup ring 55 on the exposed face opposite surface 47 due to grit in the mud permeating toward this exposed surface that ultimately lead to seal failure of seal 37. The present invention addresses this issue in a variety of options. In one sense the material of the backup ring of the present invention is made harder but at the same time maintaining flexibility to address conflicting requirements for durability from well fluids and the need for application of a desired contact force between relatively moving surfaces 53 and 41 and a needed sealing force into the backup ring 55 into surface 39. Some of the ways this accomplished is material removal between opposed ends at the exposed edge where the removed portion is in the shape of a U or a V alone or in conjunction with support in the removed location that acts akin to a spring. Another option is to strengthen all or parts of the exposed edge with electron beam radiation to increase crosslink density at the extremities while leaving interior segments unaffected for control of the sealing force on the backup ring 55 and the contact pressure against relatively rotating surfaces 53 and 41.

These and other features of the present invention will be more readily apparent to those skilled in the art from a review of the detailed description of the preferred embodiment and the associated drawings while recognizing that the full scope of the invention is to be found in the appended claims.

SUMMARY OF THE INVENTION

A backup ring for a face seal in a roller cone bit is configured to resist wear from drilling fluids present adjacent exposed faces of the backup ring. Portions are removed from an exposed end face in a variety of shapes while the hardness of the material is increased. The removal of material offsets an increase in force that would be transmitted through the backup ring on face seal assembly due to flexing. A spring can optionally be included in the removed material location. Another way is to increase the edge density of all or part of the exposed edges while leaving the interior portions unaffected by using electron beam radiation to increase the crosslink density or by other techniques that allow a unitary structure with a more durable edge region. Other material removal patterns such as a honeycomb structure can be used to optimize the design criteria for durability within a desired range of sealing and component contact force.

BRIEF DESCRIPTION OF THE DRAWINGS

FIG. 5 is a section view of a backup ring of the present invention with a u-shaped end configuration;

FIG. 6 is the backup ring of FIG. 5 shown assembled adjacent a face seal assembly in a roller cone bit;

FIG. 7 is a section view of an alternative embodiment of the backup ring with a v-shaped end configuration;

FIG. 8 is the backup ring of FIG. 7 assembled to a face seal assembly of a roller cone bit;

DETAILED DESCRIPTION OF THE PREFERRED EMBODIMENT

Figure 11:
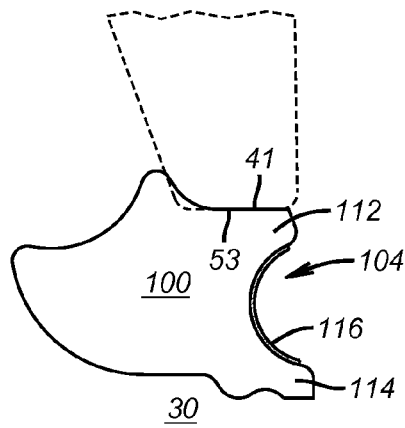
FIG. 11 is the view of FIG. 5 with an internal spring.
Figure 14:
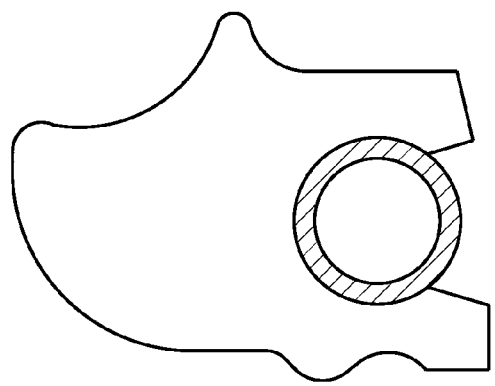
FIG. 14 is an alternative embodiment of the backup ring with a coiled spring extending circumferentially in the recess.

FIG. 5 shows the backup ring 100 of the present invention with an outer edge 102 that has a curved recess 104. When assembled to a roller cone face seal assembly 106 as previously described opposing forces 108 and 110 are represented by arrows. Assembly causes the recess 104 to get smaller than its relaxed uninstalled shape. The hardness of the ring 100 is increased as compared to the previously discussed prior embodiment where the hardness was 40-45 durometer (Shore A). The increase in hardness, modulus or density addresses the issue of cracking or pieces coming off from contact with the abrasives in well fluids notably drilling mud. However, the increase in hardness or density also increases the reaction forces to the forces represented by arrows 108 and 110. For that reason some material is removed from edge 102 that creates cantilevered components 112 and 114 that under loading from assembly and then during operation can flex toward each other to compensate for the increase in the hardness, modulus or density of the ring 100. The contemplated hardness is at least 46 on the Shore A scale with the preferred range being about 60. The amount of flexing of components 112 and 114 can be further regulated with a spring 116 placed in the recess 104 as shown in FIG. 11. The spring preferably is shaped to the wall of the recess 104 and may be bonded or otherwise secured with adhesive. The spring 116 can be external in the recess 104 or can be set back so that it is partially or totally embedded in the ring 100. Spring 116 is in the form of a ring that can be continuous or in segments, either abutting or spaced apart, with a cross-sectional shape as shown in FIG. 11. It can be seamless or have abutting or overlapping ends as in a scroll. The material of the spring 116 is compatible with the circulating drilling mud and anticipated well fluids. As shown in FIG. 14 the spring can be a coiled spring that extends continuously for 360 degrees or it can be in segments that abut or are gapped. The segments can be equally spaced presenting a symmetrical pattern or the spacing can be varied. The spring material and rate can be constant or variable.

Figure 1:
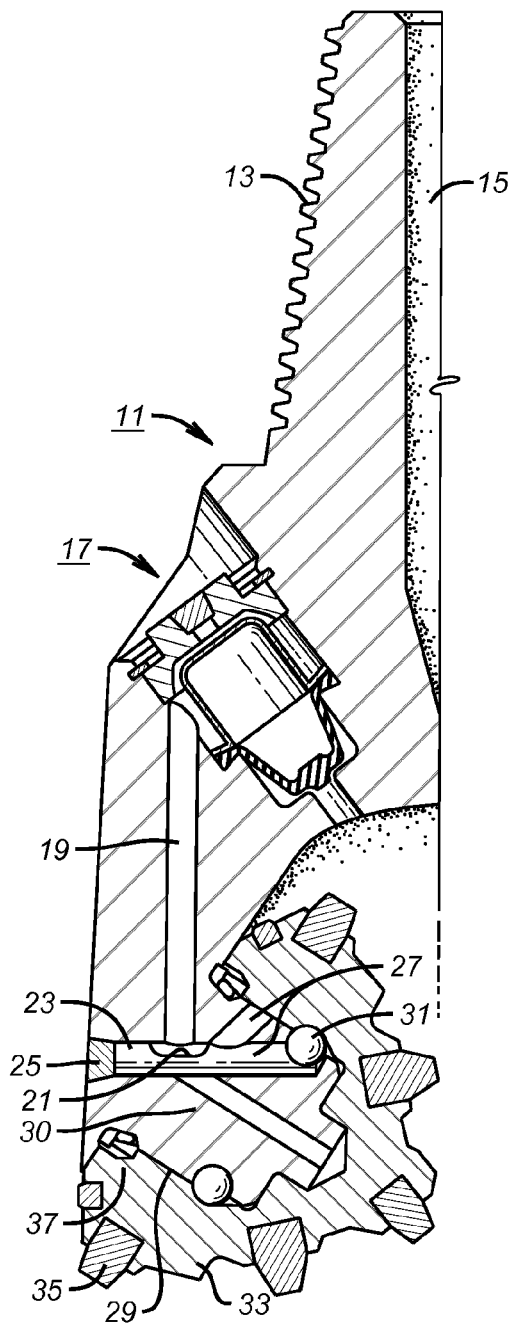
FIG. 1 is a longitudinal section view of one section of a prior art bit body of an earth-boring bit.
Figure 4:
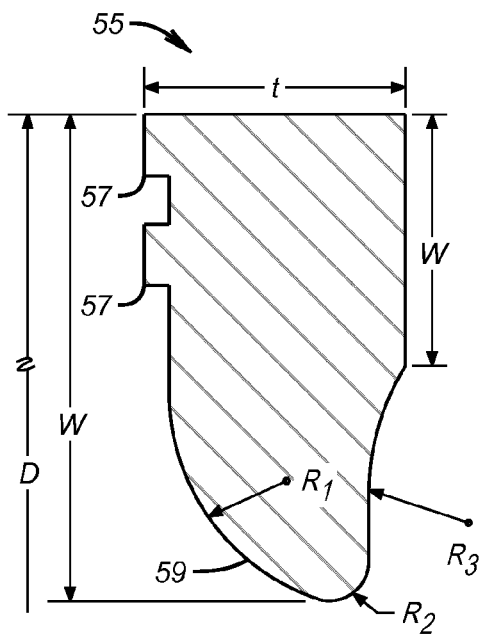
FIG. 4 is an enlarged, cross-sectional view of the backup, static seal ring of FIG. 3 in a relaxed condition.
Figure 2:
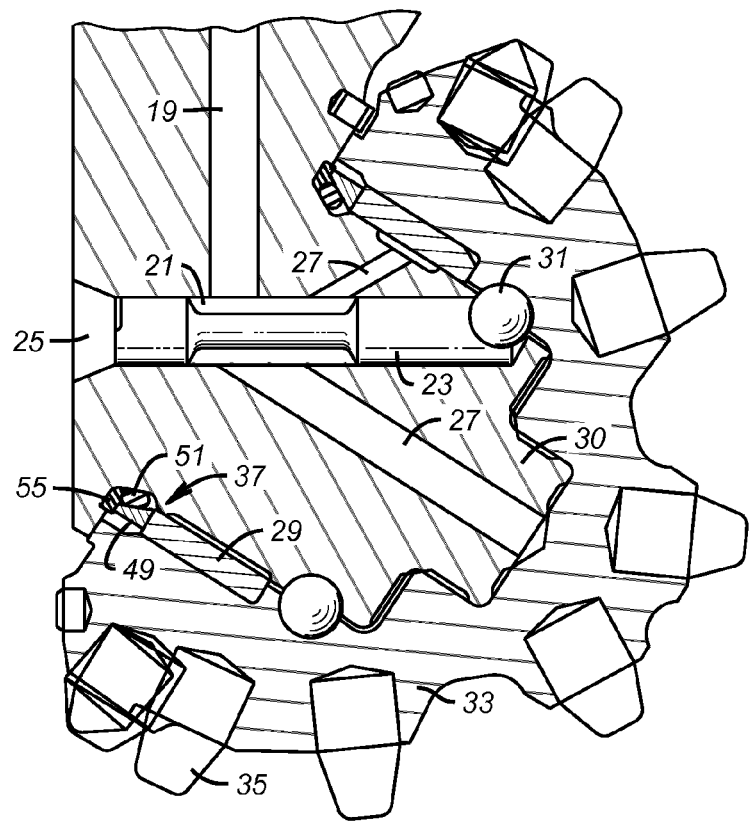
FIG. 2 is an enlarged, fragmentary longitudinal section view of the bearing shaft and seal of the bit of FIG. 1.
Figure 3:
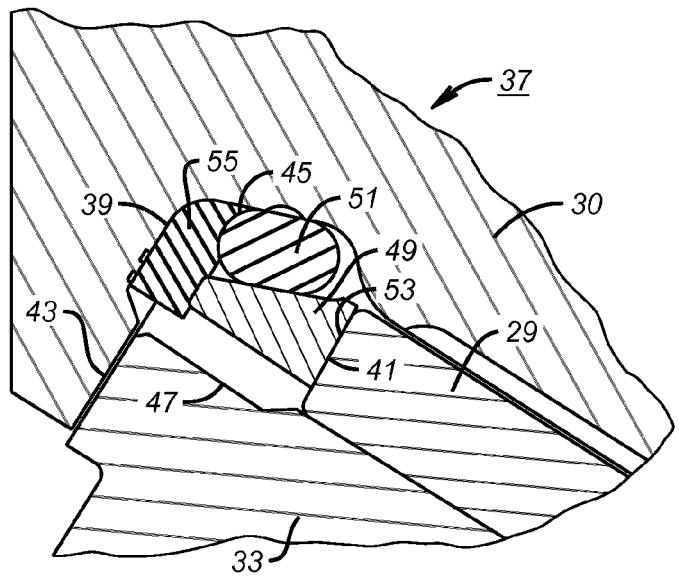
FIG. 3 is an enlarged, fragmentary section view of the seal assembly of FIG. 2.
Figure 9:
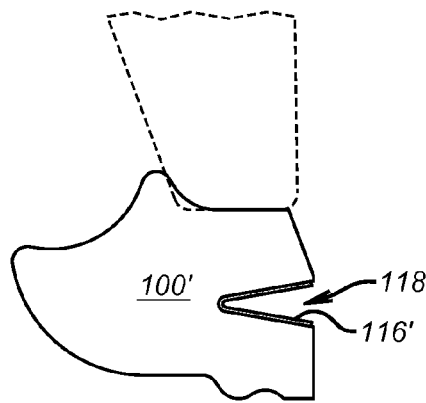
FIG. 9 is the view of FIG. 7 with an internal spring.

FIGS. 7 and 8 are similar to FIGS. 5 and 6 except for the shape of the edge recess being in the form of a V rather than a U. As shown in FIG. 8 the edge recess 118 is open in the relaxed state of the ring 100' and the recess opening is reduced or eliminated upon assembly to a face seal assembly 106'. As seen in FIG. 9 a spring 116' can line some or all the surface defining the recess 118. Otherwise the design variations applicable to FIGS. 5, 6 and 11 are equally applicable to FIGS. 7, 8 and 9.

Figures 10, 10A:
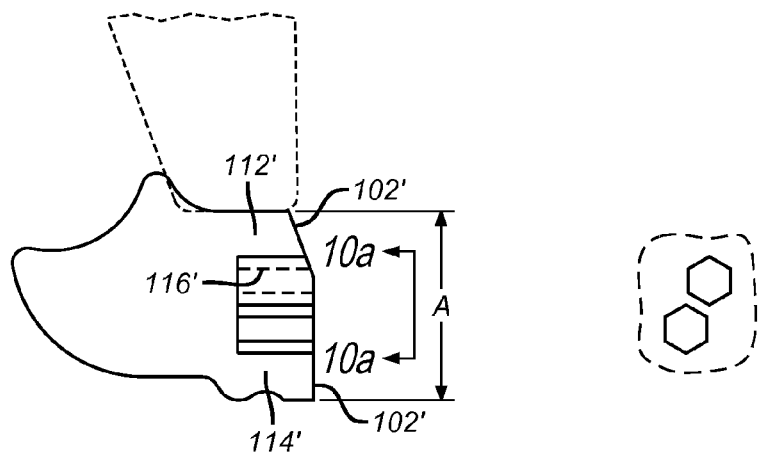
FIG. 10 is an alternative embodiment of the backup ring with a honeycomb structure.
FIG. 10a is an end view along line 10a-10a of FIG. 10.

FIGS. 10 and 10a show another concept where the flexibility when using a harder design or one that is more dense or with a higher modulus is to provide one or more generally radially oriented blind bores 120 through the end surface 102' whose depth is about half the dimension A or less. There can be one or more bores in an ordered or random pattern in one or more rows and the shape of the openings can be round or hexagonal as shown in FIG. 10a or some other shape. The shapes can all be the same or some can be different than others. The end segments 112' and 114' are better supported in FIG. 10 than in the prior described embodiments as they are not truly cantilevered. Optionally, tubular springs 116" can be inserted into some or all the bores 120 and they can be in the form of cylinders with side openings, a scroll or a spiral coil to name a few variations. Optionally they bores 120 can also be filled with a viscous material to minimize particulate accumulation carried by the drilling mud.

Figure 12:
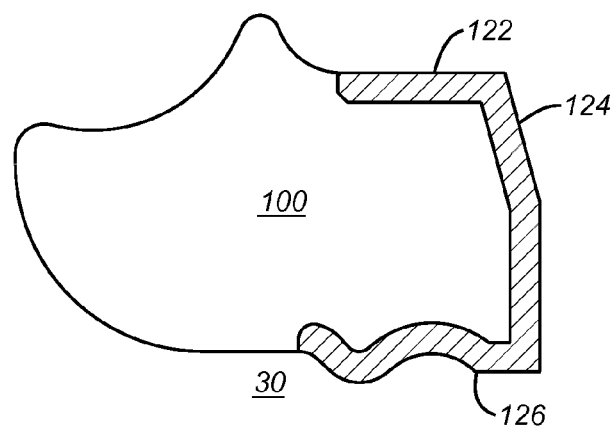
FIG. 12 is an alternative embodiment showing three adjacent edges of the backup ring made denser.
Figure 13:
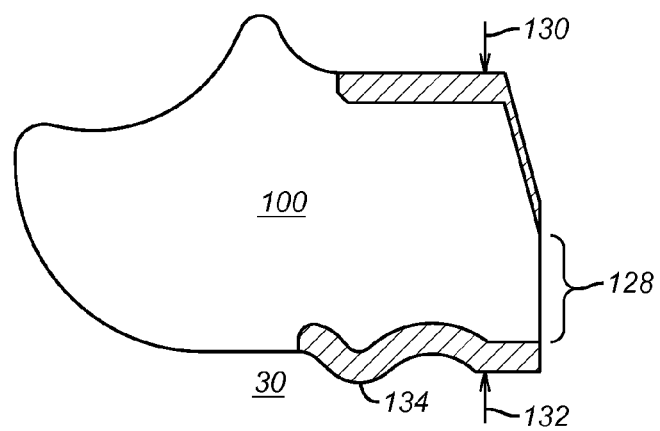
FIG. 13 is an alternative to FIG. 12 with a different pattern of greater edge density.

FIGS. 12 and 13 show another approach to dealing with the tearing issue with use of a harder, denser or a material with higher modulus than in the past. In these embodiments the edges are treated preferably by radiation that alters the bond cross-linking with areas that are not to be treated masked off. What is achieved is that the balance of the ring 100 is unaffected or minimally affected while the exterior edges 122, 124 and 126 are treated by variation of the radiation parameters to get the penetration of the change in properties to the desired depth. As shown in FIG. 12 the penetration depth is preferably constant on the affected surfaces but can be variable as shown in FIG. 13. The treatment can be continuous as shown in FIG. 12 extending to three surfaces of the ring 100 or it can be discontinuous leaving an untreated gap 128. Clearly, the gap reduces collapse resistance when forces represented by arrows 130 and 132 are applied on assembly and generate opposite reaction forces on the relatively rotating surfaces 41 and 53. The treated surfaces can extend over projection 134 to serve a similar purpose as projections 57 in the prior design of setting up a high stress location to keep out abrasive particles in drilling mud. In this technique the target hardness is at least 46 durometer Shore A with the preferred hardness of about 60 on the Shore A scale for the treated segments.

Those skilled in the art will appreciate that the design of previously used backup rings is modified in the present invention to decrease tearing or wear by altering the properties of the ring as a whole while adding in a recess in a variety of shapes to add some resiliency near an outer ring surface so as to regulate the contact force on relatively rotating surfaces. The end recess with or without a spring is used in combination with harder ring material for the backup ring of about 46 durometer Shore A or harder, about 60 Shore A, in the preferred embodiment. The recess can get smaller or close off on assembly. Alternatively end blind bored as deep as about half the height of the backup rings can be used in a variety of arrays and using a common or different size and shape. Optionally a spring of the same or varying design can be used in some or all the bores.

Rather than making the entire ring harder than the 40-45 durometer Shore A as used in the past and compensating for the added rigidity with a shaped recess that creates opposed cantilevered ends, another approach is to leave the hardness as before and instead treat the edges to make them harder, preferably about 60 durometer Shore A, to address the tearing or wear issues at the outer dimension of the backup ring. This is done preferably with electron beam radiation so that the ring is an integrated design but the edge properties are more durable for more reliable service. Other unitary ring designs with blended properties varying to harder or more durable at the outer periphery are envisioned as well as a built up structure of bonded elements to make the final ring shape with edge portions having the ability to resist tearing and wear due to greater hardness, modulus or density features.

The above description is illustrative of the preferred embodiment and many modifications may be made by those skilled in the art without departing from the invention whose scope is to be determined from the literal and equivalent scope of the claims below:

We claim:

1. A roller cone bit assembly, comprising:
   a bit body comprising a plurality of roller cones sealed to said body with a respective face seal that is backed up by a backup ring;
   said backup ring comprising a ring shaped member having an inner surface adjacent the face seal and an outer surface that is at least in part exposed to drilling fluids, said outer surface comprising an edge segment that is harder than the balance of said member, said edge segment out of contact with a respective said cone.

2. The assembly of claim 1, wherein:
   said edge segment extends to at least two adjacent sides.

3. The assembly of claim 1, wherein:
   said edge segment has uniform thickness.

4. The assembly of claim 1, wherein:
   said edge segment has non-uniform thickness.

5. The assembly of claim 1, wherein:
   said edge segment runs continuously.

6. The assembly of claim 1, wherein:
   said edge segment is discontinuous.

7. The assembly of claim 1, wherein:
   said edge segment is made of the same material as the balance of said member but has altered properties to make said segment more durable to wear or tearing.

8. The assembly of claim 1, wherein:
   said edge segment is a different and harder material than the balance of said member.

9. The assembly of claim 1, wherein:
   said edge segment further comprises a projection.

10. The assembly of claim 1, wherein:
    the hardness of said edge segment is at least 46 durometer on the Shore A scale.

* * * * *